US012725913B2

(12) United States Patent
Yin et al.

(10) Patent No.: US 12,725,913 B2
(45) Date of Patent: Sep. 1, 2026

(54) VEHICLE BUILT-IN 5G INTEGRATED ANTENNA

(71) Applicant: TAIZHOU SUZHONG ANTENNA GROUP CO., LTD., Jiangsu (CN)

(72) Inventors: Wei Yin, Jiangsu (CN); Chunmei Li, Jiangsu (CN); Hongmei Li, Jiangsu (CN); Yaquan Ye, Jiangsu (CN); Wenjun Pan, Jiangsu (CN); Yalong Xue, Jiangsu (CN)

(73) Assignee: TAIZHOU SUZHONG ANTENNA GROUP CO., LTD., Taizhou City (CN)

( * ) Notice: Subject to any disclaimer, the term of this patent is extended or adjusted under 35 U.S.C. 154(b) by 193 days.

(21) Appl. No.: 18/560,590

(22) PCT Filed: Apr. 28, 2022

(86) PCT No.: PCT/CN2022/089990

§ 371 (c)(1),
(2) Date: Nov. 13, 2023

(87) PCT Pub. No.: WO2022/237564

PCT Pub. Date: Nov. 17, 2022

(65) Prior Publication Data

US 2024/0250413 A1 Jul. 25, 2024

(30) Foreign Application Priority Data

May 11, 2021 (CN) ........................ 202110512301.2

(51) Int. Cl.
*H01Q 1/32* (2006.01)

(52) U.S. Cl.
CPC .......... *H01Q 1/3233* (2013.01); *H01Q 1/325* (2013.01)

(58) Field of Classification Search
CPC ........ H01Q 1/32; H01Q 1/325; H01Q 1/3275; H01Q 1/3283; H01Q 1/3291; H01Q 1/12; H01Q 1/42; H01Q 21/28
See application file for complete search history.

(56) References Cited

U.S. PATENT DOCUMENTS 11,056,775 B2 * 7/2021 Shiroki .................. H01Q 21/28
2006/0094294 A1 * 5/2006 Blickle ................ H01Q 1/3275 439/544

(Continued)

FOREIGN PATENT DOCUMENTS

CN 101707279 A 5/2010
CN 203813740 U 9/2014

(Continued)

OTHER PUBLICATIONS

Jun. 28, 2022 International Search Report issued in International Patent Application No. PCT/CN2022/089990.

(Continued)

*Primary Examiner* — Alexander H Taningco
(74) *Attorney, Agent, or Firm* — Oliff PLC

(57) ABSTRACT

A vehicle built-in 5G integrated antenna includes: a plastic housing, a plastic mounting support, an antenna printed circuit substrate, a high-precision GNSS receiving module, a 5G antenna, a V2X antenna, and a connector; a high-precision GNSS receiving module mounting pillar is disposed in the plastic housing, and the high-precision GNSS receiving module, the V2X antenna, and the 5G antenna are mounted on a PCB and are mounted on the high-precision GNSS receiving module mounting pillar through the PCB; the plastic housing is mounted with the plastic mounting support through a mounting fixation post; and the plastic mounting support is mounted with an antenna printed circuit substrate a 5G matching circuit and V2X matching circuit. The antenna integrates a high-precision navigation, a 5G (Continued)

communication signal antenna and a V2X antenna, and is suitable for mounting and use in all types of vehicles.

4 Claims, 2 Drawing Sheets

(56) References Cited

U.S. PATENT DOCUMENTS

| | | | | |
|---|---|---|---|---|
| 2017/0054204 | A1* | 2/2017 | Changalvala | H01Q 1/42 |
| 2019/0089419 | A1 | 3/2019 | Kim et al. | |
| 2020/0243463 | A1* | 7/2020 | Koch | H01L 23/49816 |
| 2022/0068740 | A1* | 3/2022 | Kong | H10W 70/635 |

FOREIGN PATENT DOCUMENTS

| | | | | | |
|---|---|---|---|---|---|
| CN | 105703063 | A | | 6/2016 | |
| CN | 206259913 | U | | 6/2017 | |
| CN | 110165368 | A | * | 8/2019 | H01Q 1/22 |
| CN | 110247199 | A | | 9/2019 | |
| CN | 110299605 | A | | 10/2019 | |
| CN | 209981460 | U | | 1/2020 | |
| CN | 111082824 | A | | 4/2020 | |
| CN | 112103670 | A | | 12/2020 | |
| CN | 110911803 | B | * | 1/2021 | H01Q 1/50 |
| CN | 112542676 | A | | 3/2021 | |
| CN | 113054448 | A | * | 6/2021 | H01Q 21/30 |
| CN | 113113763 | A | * | 7/2021 | H01Q 1/32 |
| CN | 113178684 | A | | 7/2021 | |
| CN | 214505763 | U | | 10/2021 | |
| CN | 113644411 | A | * | 11/2021 | H01Q 1/42 |
| WO | 2020/089584 | A1 | | 5/2020 | |

OTHER PUBLICATIONS

Feb. 24, 2025 Chinese Office Action issued in Chinese Patent Application No. 202110512301.2.

Sep. 3, 2024 Office Action issued in Japanese Patent Application No. 2023-557308.

Sep. 29, 2024 Office Action issued in Chinese Patent Application No. 202110512301.2.

May 11, 2021 Search Report issued in Chinese Patent Application No. 2021105123012.

* cited by examiner

VEHICLE BUILT-IN 5G INTEGRATED ANTENNA

CROSS-REFERENCE TO RELATED APPLICATIONS

This application is a National Stage of International Application No. PCT/CN2022/089990, filed Apr. 28, 2022, which claims priority to Chinese Patent Application No. 202110512301.2, filed May 11, 2021, both of which are hereby incorporated by reference in their entireties.

TECHNICAL FIELD

The present disclosure relates to the technical field of vehicle antennas, and particularly to a vehicle built-in 5G integrated antenna.

BACKGROUND

The five-in-one deep layout of 'navigation+Internet of vehicles+automatic driving+big data+chip' meets the overall upgrade of the era of intelligent driving. Cloud-integrated satellite navigation system GNSS solutions are provided for Internet vehicle customers. The consumers are provided with high-precision lane-level navigation experiences, and by means of GNSS integrated positioning, it is possible to solve the positioning problem of an on-board positioning device in case of a satellite signal loss, reduce the accident rate of developed transportation and large traffic flow, and improve the comprehensive positioning capability of the terminal. The customers of autonomous vehicles are provided with a real-time and high-precision position computing service covering the whole country.

The intelligent connected vehicle is not only one of the most important 5G application scenarios, but also the core direction of new infrastructure in the field of artificial intelligence. The high-precision map is necessary to achieve high-level automatic driving (level 3 and above), and will become an important time point for the start of the high-precision commercialization in future. By integrating the global positioning system navigation technology GNSS, the vehicle-to-vehicle communication technology V2X, the wireless communication 5G and the remote sensing technology, the intelligent connected vehicle has determined a new development direction of automotive technologies, and realized the compatibility of manual driving and automatic driving. From the perspective of the user, the user's driving experience is further improved and optimized. The automatic driving achieves the ultimate driving experience by liberating manpower and driving by machine.

SUMMARY

The embodiments of the present disclosure provide a vehicle built-in 5G integrated antenna, which is a vehicle built-in 5G integrated high-precision GNSS and V2X antenna, in which a high-precision navigation module, a 5G signal antenna and a V2X antenna are integrated in one antenna housing and mounted in a vehicle, thereby bringing conveniences to drivers and passengers. The vehicle built-in 5G integrated antenna includes a plastic housing, a plastic mounting support, an antenna printed circuit substrate, a high-precision GNSS receiving module, a 5G antenna, a V2X antenna and a connector;

a high-precision GNSS receiving module mounting pillar is disposed in the plastic housing; the high-precision GNSS receiving module, the V2X antenna and the 5G antenna are mounted on a PCB and then mounted on the high-precision GNSS receiving module mounting pillar through the PCB; The plastic housing is mounted with the plastic mounting support through a mounting fixation post; and the plastic mounting support is mounted with an antenna printed circuit substrate which provided with a GNSS high-precision navigation module circuit and a 5G matching circuit and V2X matching circuit, which transmit signals to a terminal processing device for use through a signal connector and a transmission line.

In an embodiment, the plastic mounting support is provided with a mounting hole.

In an embodiment, front and back sides of the PCB are provided with PCB printed circuit boards, and further provided with a plurality of copper-clad strip conductors which are disposed alternately and connected in series through copper-clad through holes at ends thereof to form a distributed printed circuit; two in-phase signals are converted into a signal with a phase difference of 90° by an electric bridge, and then is amplified by low-noise printing to achieve the effect of high-precision positioning.

In an embodiment, the connector is provided with a GNSS connector, a 5G signal connector and a V2X connector.

In an embodiment, the high-precision GNSS receiving module, the V2X antenna and the 5G antenna are mounted on the PCB, respectively, and output signals to the terminal processing device through the GNSS connector, the 5G signal connector and the V2X connector, respectively, so as to perform high-precision navigation and positioning, vehicle-vehicle synergy and vehicle-road synergy.

In an embodiment, the 5G antenna is provided with a first 5G antenna, a second 5G antenna, a third 5G antenna and a fourth 5G antenna.

In an embodiment, the plastic housing is provided with a connector outlet where a fixing clamp is mounted to fix and position the 5G signal connector, the GNSS connector and the V2X connector which are led out.

In an embodiment, during use, the vehicle built-in 5G integrated antenna is mounted in a gap between upper sheet metals of a vehicle or in a deflector plate at a tail of the vehicle by screws through the mounting hole on the plastic mounting support; the connector is connected to the terminal processing device at a control panel in a vehicle cab and displayed on the screen through a shielded data signal transmission line for a GNSS satellite navigation during vehicle transportation; the V2X antenna is adopted for a vehicle-vehicle synergy and a vehicle-road synergy during vehicle transportation; and the 5G signal connector is connected to the terminal processing device through the shielded data signal transmission line for use by 5G devices, thereby bringing conveniences to drivers and passengers.

The vehicle built-in 5G integrated antenna according to the embodiments of the present disclosure is reasonable in design and compact in structure, in which the GNSS module, the 5G signal receiving antenna and the V2X antenna are integrated in one antenna housing and mounted in the vehicle, thereby bringing conveniences to drivers and passengers. As being mounted in the vehicle, the vehicle built-in 5G integrated antenna is protected from wind, sun and rain, so that the signal reception stability is improved and the service life is long.

BRIEF DESCRIPTION OF THE DRAWINGS

In order to more clearly illustrate the technical solutions in the embodiments of the present disclosure or in the prior art, the drawings to be used in the description of the embodiments or the prior art will be briefly described below. Obviously, the drawings in the following description only illustrate some embodiments of the present disclosure, and other drawings can be obtained therefrom by those skilled in the art without paying any creative labor. In that drawings.

REFERENCE NUMERALS

1: plastic housing;
2: plastic mounting support;
3: printed circuit substrate;
4: high-precision GNSS receiving module;
5: PCB;
6: GNSS connector;
7: 5G signal connector;
8: V2X connector;
9: V2X antenna;
10: 5G antenna;
11: sealing ring;
1-1: mounting fixation post;
2-1: mounting hole;
2-2: connector outlet;
10-1: first 5G antenna;
10-2: second 5G antenna;
10-3: third 5G antenna;
10-4: fourth 5G antenna.

DESCRIPTION OF EMBODIMENTS

In order that the objectives, technical solutions and advantages of the embodiments of the present disclosure are clearer, the embodiments of the present disclosure are further described in detail below with reference to the drawings. The illustrative embodiments of present disclosure and the description thereof are used here to explain rather than limiting the present disclosure.

In the description of the specification, the used terms such as 'include', 'comprise', 'have' and 'contain' are all open terms, meaning including but not limited to. Descriptions referring to the terms 'one embodiment', 'one specific embodiment', 'some embodiments', 'for example', etc. mean that a specific feature, structure, or characteristic described in connection with the embodiment or example is included in at least one embodiment or example of the present disclosure. In the specification, the schematic expressions of the above terms do not necessarily refer to the same embodiment or example. Moreover, the described specific features, structures or characteristics may be combined appropriately in any one or more embodiments or examples. The order of steps involved in each embodiment is used to schematically illustrate the implementation of the present disclosure, and it is not limited herein and can be appropriately adjusted as needed.

Figure 1:
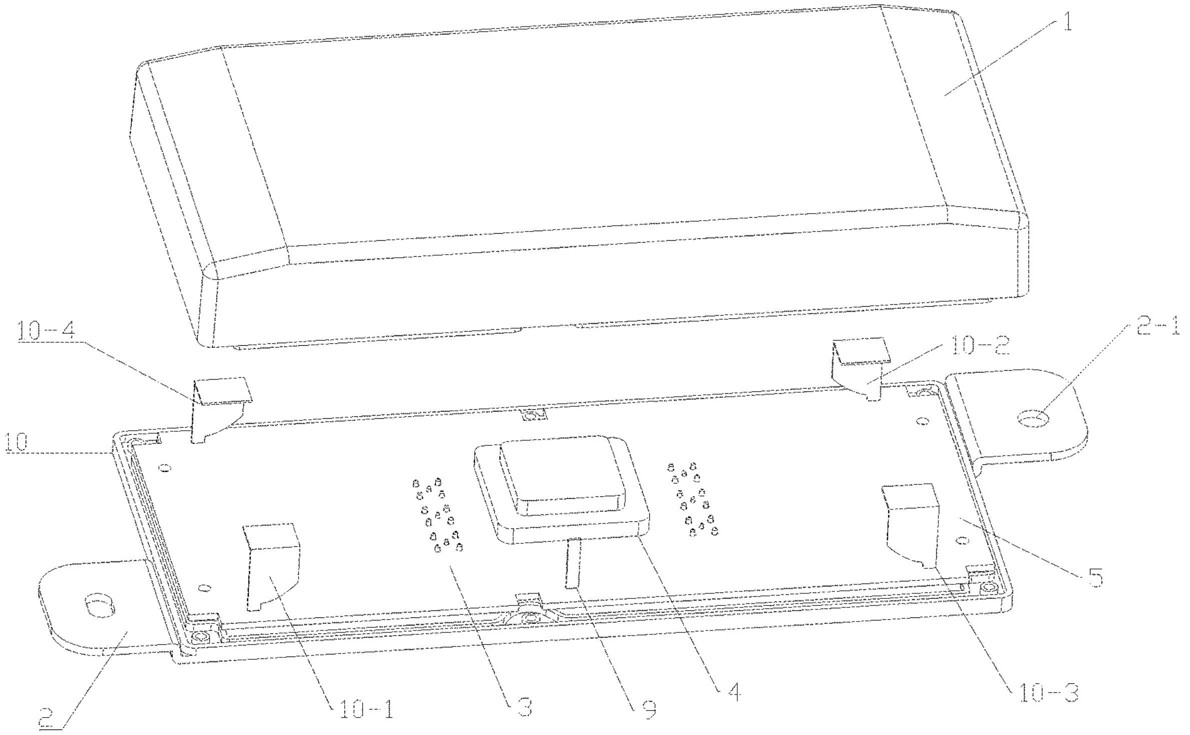
FIG. 1 is a structural diagram of a vehicle built-in 5G integrated antenna after a plastic housing is opened according to an embodiment of the present disclosure.
Figure 2:
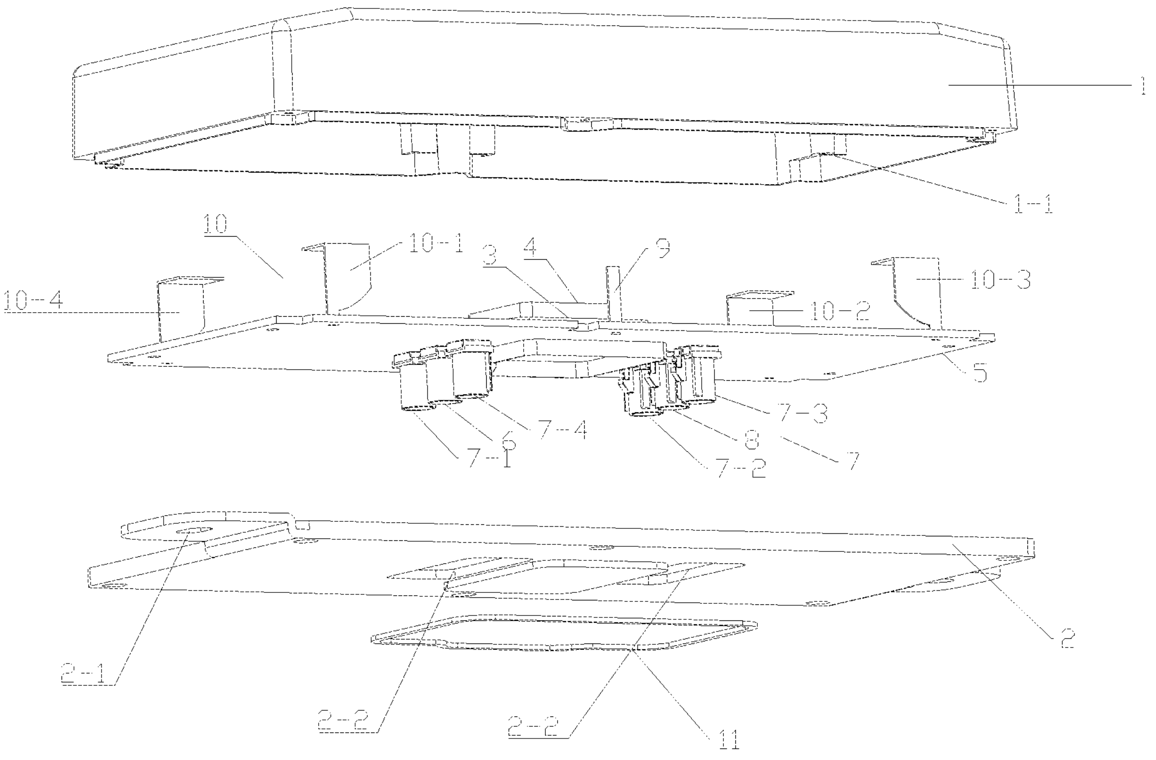
FIG. 2 is an exploded view of a vehicle built-in 5G integrated antenna according to an embodiment of the present disclosure.

In an embodiment of the present disclosure, as illustrated in FIGS. 1 and 2, a vehicle built-in 5G integrated antenna includes a plastic housing 1, a plastic mounting support 2, a printed circuit substrate 3, a high-precision GNSS receiving module 4, a PCB 5, a GNSS connector 6, a 5G signal connector 7, a V2X connector 8, a V2X antenna 9, a 5G antenna 10 and a sealing ring 11.

The vehicle built-in 5G integrated antenna includes a plastic housing 1, a plastic mounting support 2, an antenna printed circuit substrate 3, a high-precision GNSS receiving module 4, a 5G antenna 10, a V2X antenna 9 and a connector.

A high-precision GNSS receiving module mounting pillar is disposed in the plastic housing 1; the high-precision GNSS receiving module 4, the V2X antenna 9 and the 5G antenna 10 are mounted on the PCB 5 and then mounted on the high-precision GNSS receiving module mounting pillar through the PCB 5; the plastic mounting support 2 is provided with a mounting hole 2-1, and the plastic housing 1 is mounted with the plastic mounting support 2 through a mounting fixation post 1-1.

The antenna printed circuit substrate 3 is mounted on the plastic mounting support 2, and the antenna printed circuit substrate 3 is provided with a GNSS high-precision navigation module circuit and a 5G matching circuit and V2X matching circuit, which transmit signals to a terminal processing device for use through a signal connector and a transmission line.

In an embodiment, front and back sides of the PCB 5 are provided with PCB printed circuit boards, and further provided with a plurality of copper-clad strip conductors which are disposed alternately and connected in series through copper-clad through holes at ends thereof to form a distributed printed circuit. Two in-phase signals are converted into a signal with a phase difference of 90° by an electric bridge, and then is amplified by low-noise printing to achieve the effect of high-precision positioning.

In an embodiment, the connector is provided with a GNSS connector 6, a 5G signal connector 7 and a V2X connector 8.

In an embodiment, the high-precision GNSS receiving module 4, the V2X antenna 9 and the 5G antenna 10 are mounted on the PCB 5, respectively, and output signals to the terminal processing device through the GNSS connector 6, the 5G signal connector 7 and the V2X connector 8, respectively, so as to perform high-precision navigation and positioning, vehicle-vehicle synergy and vehicle-road synergy.

In an embodiment, the 5G antenna 10 is provided with a first 5G antenna 10-1, a second 5G antenna 10-2, a third 5G antenna 10-3 and a fourth 5G antenna 10-4.

In an embodiment, the plastic housing 1 is provided with a connector outlet 2-2 where a fixing clamp to fix and position the 5G connector, the GNSS connector and the V2X connector which are led out.

In an embodiment, a sealing ring 11 is mounted at a lower part of the plastic mounting support 2 for sealed mounting.

In an embodiment, the high-precision GNSS receiving module 4 is composed of a ceramic antenna, a printed patch circuit and a shielding case.

In an embodiment, during use, the vehicle built-in 5G integrated antenna is mounted in a gap between upper sheet metals of the vehicle or in a deflector plate at the rear of the vehicle by screws through the mounting hole 2-1 on the plastic mounting support 2, and the connector is connected to the terminal processing device of a control panel in a vehicle cab and displayed on the screen through a shielded data signal transmission line for a GNSS satellite navigation during vehicle transportation; the V2X antenna 9 is adopted for a vehicle-vehicle synergy and a vehicle-road synergy during vehicle transportation; the 5G signal connector is connected to the terminal processing device through the shielded data signal transmission line for use by 5G devices, thereby bringing conveniences and safety to drivers and passengers.

The specific embodiments described above further explain the objectives, the technical solutions and the advantageous effects of the present disclosure in detail. It should be understood that those described above are only specific embodiments of the present disclosure rather than limitations to the protection scope of the present disclosure. Any modification, equivalent substitution, improvement, etc. made within the spirit and principle of the present disclosure should fall within the protection scope of the present disclosure.

What is claimed is:

1. A vehicle built-in 5G integrated antenna, comprising:

a plastic housing, a plastic mounting support, an antenna printed circuit substrate, a high-precision GNSS receiving module, four 5G antennas, a V2X antenna and a connector;

a mounting fixation post is disposed in the plastic housing; the high-precision GNSS receiving module, the V2X antenna and the four 5G antennas are mounted on a PCB and the PCB is mounted on the mounting fixation post; the plastic housing is mounted with the plastic mounting support through the mounting fixation post; and the PCB equipped with the antenna printed circuit substrate is mounted on the plastic mounting support, and the antenna printed circuit substrate is provided with a GNSS high-precision navigation module circuit and a 5G matching circuit and V2X matching circuit, which transmit signals to a terminal processing device for use through a signal connector and a transmission line;

wherein the four 5G antennas are installed at four corners of the PCB, respectively, the connector comprises a GNSS connector, four 5G signal connectors and a V2X connector, the GNSS connector, the four 5G signal connectors, and the V2X connector are arranged on a back surface of the PCB opposite to a front surface where the high-precision GNSS receiving module is installed, and the four 5G signal connectors are designated as a first 5G signal connector, a second 5G signal connector, a third 5G signal connector, and a fourth 5G signal connector, the first 5G signal connector, the GNSS connector, and the fourth 5G signal connector are arranged sequentially along a width direction of the PCB on the back surface, and located on a first side of the high-precision GNSS receiving module, and the third 5G signal connector, the V2X connector, and the second 5G signal connector are arranged sequentially along the width direction on the back surface, and located on a second side of the high-precision GNSS receiving module opposite to the first side;

wherein a distance between any one of the first 5G signal connector, the GNSS connector, and the fourth SG signal connector and the two 5G antennas located on the first side of the high-precision GNSS receiving module along a length direction of the PCB is defined as a first distance;

a distance between any one of the third SO signal connector, the V2X connector, and the second SG signal connector and the two 5G antennas located on the second side of the high-precision GNSS receiving module along the length direction is defined as a second distance;

a distance between any one of the first 5G signal connector, the GNSS connector, and the fourth SG signal connector and the high-precision GNSS receiving module along the length direction is defined as a third distance;

a distance between any one of the third 5G signal connector, the V2X connector, and the second SG signal connector and the high-precision GNSS receiving module along the length direction is defined as a fourth distance, and the third distance is smaller than the first distance, and the fourth distance is smaller than the second distance.

2. The vehicle built-in 5G integrated antenna according to claim 1, wherein the plastic mounting support is provided with a mounting hole.

3. The vehicle built-in 5G integrated antenna according to claim 1, wherein front and back sides of the PCB are provided with PCB printed circuit boards, and further provided with a plurality of copper-clad strip conductors which are disposed alternately and connected in series through copper-clad through holes at ends thereof to form a distributed printed circuit, so that two in-phase signals are converted into a signal with a phase difference of 90° by an electric bridge.

4. The vehicle built-in 5G integrated antenna according to claim 1, wherein the plastic housing is provided with a connector outlet where a fixing clamp is mounted to fix and position the 5G signal connector, the GNSS connector and the V2X connector which are led out.

* * * * *